United States Patent [19]

Klekar

[11] 4,033,268

[45] July 5, 1977

[54] END FITTING FOR CARGO BAR

[76] Inventor: Virginia M. Klekar, 1719 Mendocino Drive, Concord, Calif. 94521

[22] Filed: Mar. 19, 1975

[21] Appl. No.: 559,926

[52] U.S. Cl. .............................. 105/497; 105/499; 105/503

[51] Int. Cl.² ........................................ B61D 45/00

[58] Field of Search .......... 105/489, 493, 494, 495, 105/497, 498, 499, 500, 501, 502, 503, 376

[56] References Cited

UNITED STATES PATENTS

| 2,980,037 | 4/1961 | Elsner | 105/498 |
| 3,534,692 | 10/1970 | Val Verde | 105/500 |
| 3,799,070 | 3/1974 | Munson | 105/501 |
| 3,952,671 | 2/1975 | Val Verde | 105/501 X |
| Re. 26,309 | 11/1967 | Heard | 105/499 |

Primary Examiner—Robert J. Spar
Assistant Examiner—Carl Rowold
Attorney, Agent, or Firm—Warren, Chickering & Grunewald

[57] ABSTRACT

An end fitting for a cargo bar of the type formed for use with a belt rail to restrain or support cargo against shifting in a truck, railroad car, etc. is disclosed. The improved end fitting is formed for coupling to three of the most commonly used belt rails in the trucking industry. The end fitting includes two coupling apparatus and a pair of spaced apart flanges which are formed for cooperative coupling to a first belt rail structure, reciprocation of part of one of the coupling apparatus to a withdrawn position, and cooperative coupling to a second and a third belt rail. Two forms of end fittings are disclosed.

12 Claims, 15 Drawing Figures

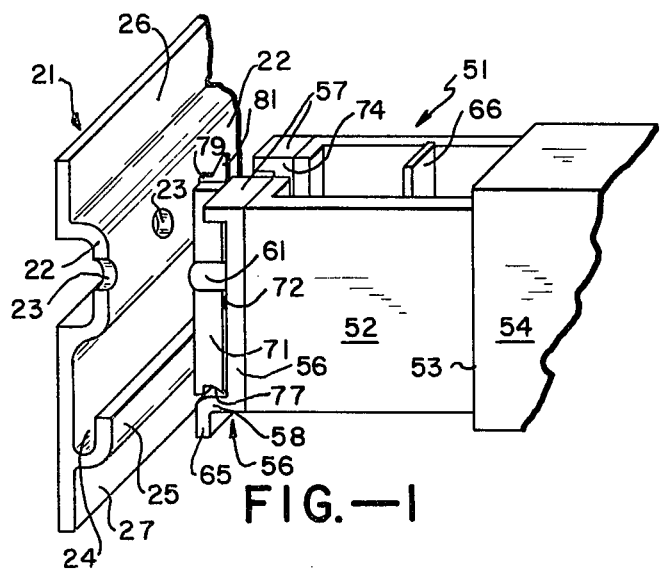
FIG.—1
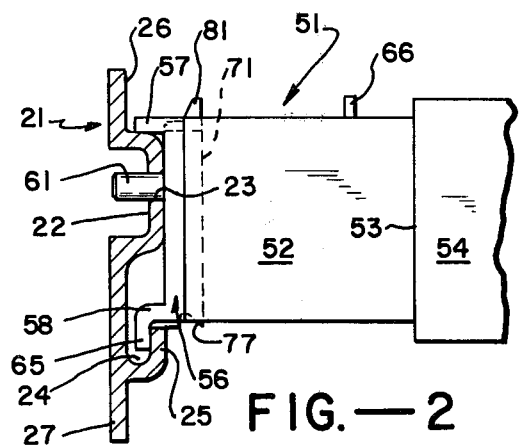
FIG.—2
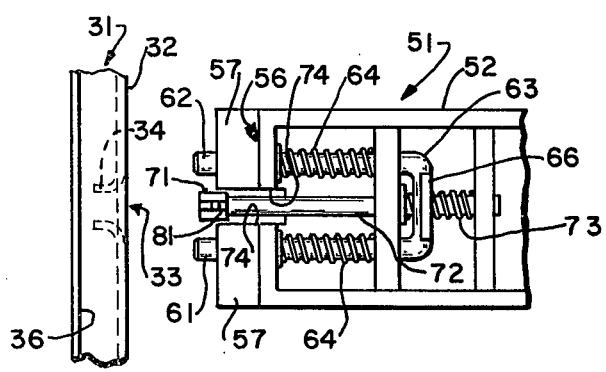
FIG.—3
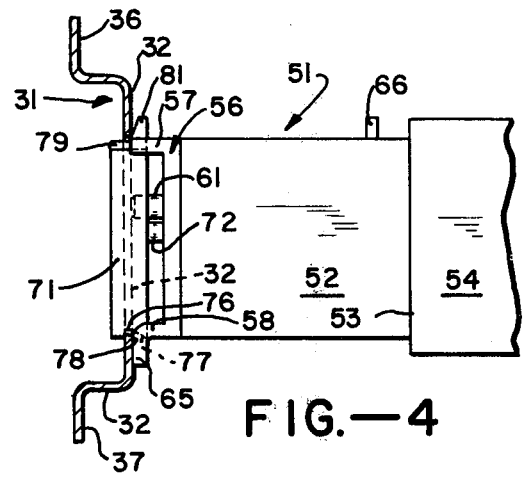
FIG.—4
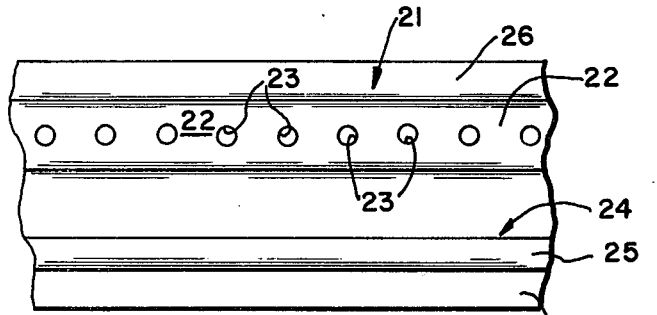
FIG.—5
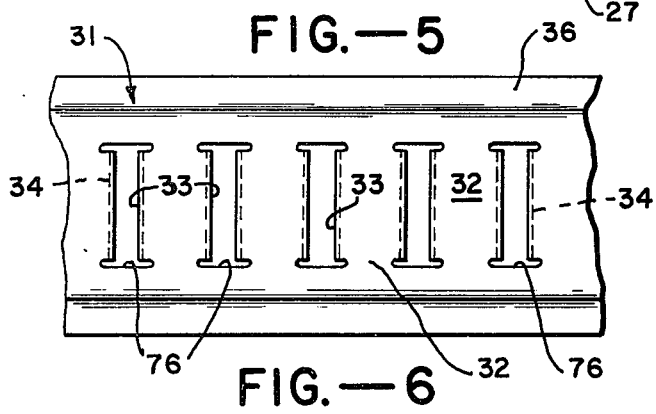
FIG.—6
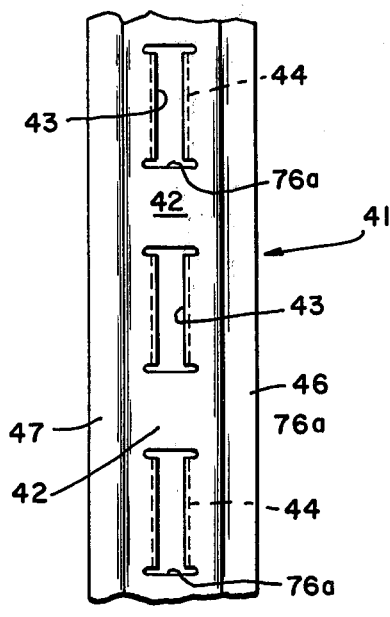
FIG.—7

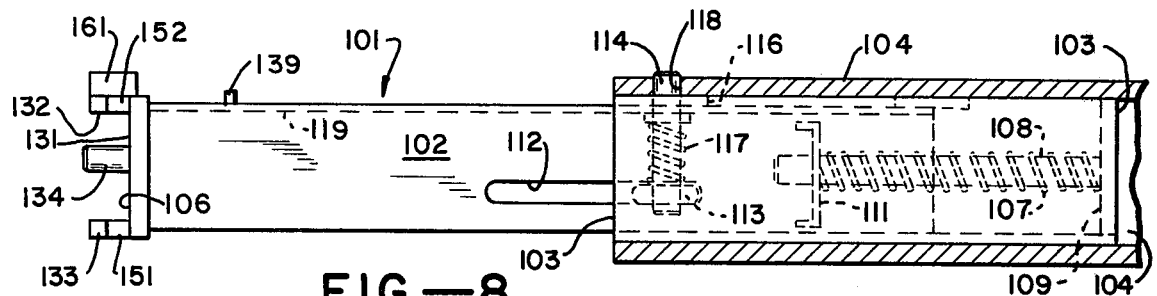
FIG.—8
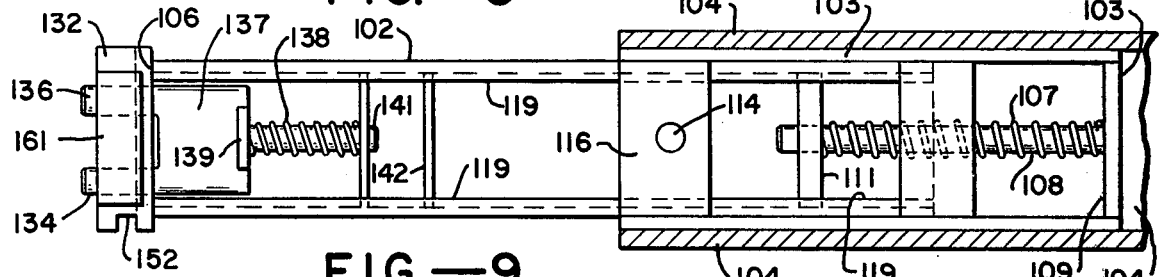
FIG.—9
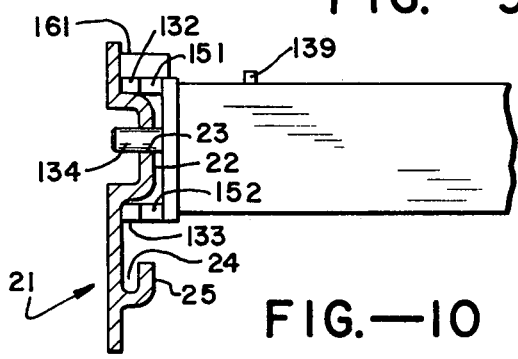
FIG.—10
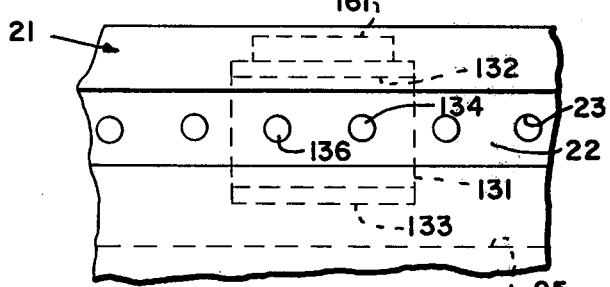
FIG.—11
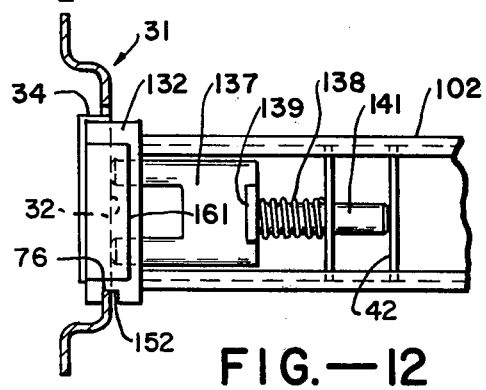
FIG.—12
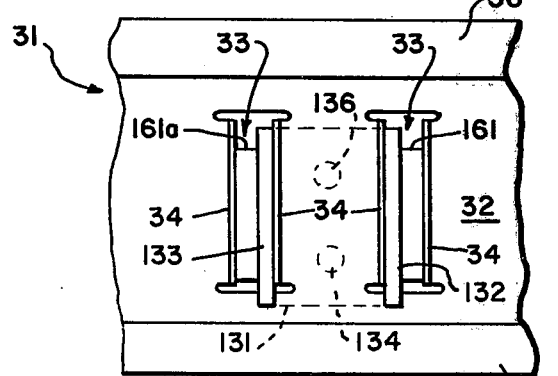
FIG.—13
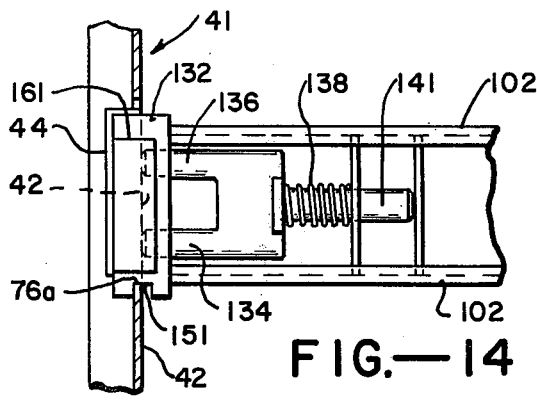
FIG.—14
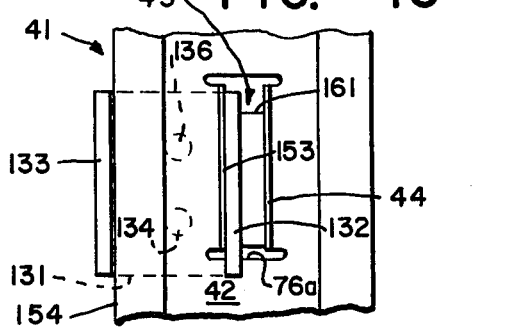
FIG.—15

END FITTING FOR CARGO BAR

BACKGROUND OF THE INVENTION

The use of cargo bars or deck and shoring beams in the trucking and railroad industries, as well as in connection with the shipping industry, as a means for securing or shoring freight loads against movement is widespread. The cargo bars are formed as round, square or rectangular, high strength, tubular steel or aluminum beams having end fittings which can be selectively coupled or locked in interfitting relation with belt rails mounted on the side walls of the inside of a truck trailer or railroad car. The belt rails are typically formed with grooves and/or openings of various configurations along the length of the belt rail so that the cargo bars can be locked at almost any position along the belt rails to accommodate loads of various sizes.

Most belt rails are formed as horizontally extending members which are secured at predetermined strategic heights. There are, however, vertically extending belt rails having a plurality of adjacent vertical coupling means, such as openings, so that cargo bars can be coupled to these belt rails at virtually any desired height inside the trailer.

While the use of cargo shoring beams and bars has been generally quite satisfactory, a wide variety of different systems employing different types of belt rail coupling structures and corresponding end fittings has been developed. This has made interchanging of cargo bars virtually impossible. While there are a number of different systems, two systems currently dominate the trucking industry. The first is a system which employs a horizontally extending belt rail with a horizontally extending protruding section having a series of side-by-side apertures therein and a continuous channel or groove below the apertures. The cargo bar end fitting has a mating pair of pins and foot portion which extend into the apertures and groove, respectively. This system is shown in U.S. Pat. No. Re. 26,309 and is manufactured by Evans Products Company, Industrial Division, of Plymouth, Mich. A second cargo bar-belt rail system which is in widespread use similarly employs a horizontally extending belt rail with a horizontally extending protruding section in which side-by-side vertically extending slots are provided. This same system includes a vertically extending belt rail having vertically superimposed and aligned slots in a protruding and vertically extending section of the belt rail. The second system is currently commercially available through Aeroquip Corporation of Jackson, Mich. and Ancra Corporation of El Segundo, Calif., and is sold under the designation "Series E" belt rail and shoring beam system.

Other belt rail systems are in use, particularly in the railroad and shipping industries, but these two described systems dominate the trucking industry. Typical of some of the other belt rail-cargo bar systems which have been used are the devices set forth in U.S. Pat. Nos. 2,977,899; 3,063,387; 3,066,620; 3,345,956; 3,782,295; and 3,799,070.

Most trucking companies are not equipped with a single system, and as a result they must keep a supply of cargo bars which includes, as a minimum, the two dominant belt rail-cargo bar systems, and may include other types of bars. This duplication of equipment is, of course, costly, and invariable results in shortages of one kind of bar in one area while other areas have an excess. The most usual solution to the problem is for the company to carry more cargo bars of each type than is actually required.

Accordingly, it is an object of the present invention to provide an end fitting for a cargo bar or shoring beam which is compatible and can be coupled to two of the most commonly employed, wall mounted, belt rail systems in the trucking industry.

It is a further object of the present invention to provide an end fitting for a cargo bar which can be used with vertically extending as well as horizontally extending belt rail systems.

Still another object of the present invention is to provide an end fitting for a cargo bar which may be easily mounted to the central beam of existing cargo bars so that they may be adapted for use with a plurality of belt rail systems.

Still another object of the present invention is to provide an end fitting for a cargo bar or shoring beam which may be easily coupled to the belt rail.

It is still a further object of the present invention to provide an end fitting for a cargo bar or shoring beam which is economical and easy to manufacture, has high strength and is durable, and has a minimum number of moving parts.

The end fitting for the cargo bar of the present invention has other features and objects of advantage, some of which will become more apparent from or are set forth in detail in the drawing and the following description.

SUMMARY OF THE INVENTION

The end fitting of the present invention is designed for use with a cargo bar adapted to be coupled to a first belt rail and a second belt rail having differing coupling structures, and the end fitting includes a shank adapted for mounting to the end of the cargo bar, the shank terminating in a coupling end, and a first coupling means and a second coupling means extending from the coupling end and formed for coupling to the first belt rail and the second belt rail, respectively. The improvement in the end fitting is comprised, briefly, of a pair of spaced apart flange means extending outwardly from the end coupling, the flange means being formed and dimensioned for cooperative engagement of the first belt rail with the first coupling means and further formed for cooperative engagement of the second belt rail with the second coupling means so as to secure the bar against uncoupling under cargo loading forces when coupled to either of the belt rails, and at least one of the first and second coupling means being mounted to the coupling end for selective movement to a withdrawn position to enable coupling by the remainder of the coupling means. In one aspect of the invention locking bar means movably mounted to the coupling end is provided as the second coupling means, while in another aspect of the invention the pair of flanges are spaced apart, formed of a thickness and notched in a manner to provide the second coupling means.

DESCRIPTION OF THE DRAWING

FIG. 1 is a fragmentary, top perspective view of one form of belt rail and an end fitting for a cargo bar constructed in accordance with the present invention.

FIG. 2 is a fragmentary, side elevational view, partially in cross-section, showing the end fitting of FIG. 1 coupled to the belt rail of FIG. 1.

FIG. 3 is a fragmentary, top view of the end fitting of FIG. 1 shown proximate a second type of belt rail.

FIG. 4 is a fragmentary, side elevational view showing the end fitting of the present invention coupled to the belt rail of FIG. 3.

FIG. 5 is a fragmentary, front elevational view of the belt rail of FIG. 1.

FIG. 6 is a fragmentary, front elevational view of the belt rail of FIG. 3.

FIG. 7 is a fragmentary, front elevational view of a third, vertically extending belt rail.

FIG. 8 is a side elevational view of a modified form of an end fitting constructed in accordance with the present invention.

FIG. 9 is a top view of the end fitting of FIG. 8.

FIG. 10 is a fragmentary, side elevational view, partially in cross-section, of the end fitting of FIG. 8 as coupled to the belt rail of FIG. 5.

FIG. 11 is a fragmentary, rear elevational view of the end fitting and belt rail of FIG. 10.

FIG. 12 is a fragmentary, side elevational view, partially in cross-section, of the end fitting of FIG. 8 as shown coupled to the belt rail of FIG. 6.

FIG. 13 is a fragmentary, rear elevational view of the end fitting and belt rail of FIG. 12.

FIG. 14 is a fragmentary, side elevational view, partially in cross-section, of the end fitting of FIG. 8 as shown coupled to the belt rail of FIG. 7.

FIG. 15 is a fragmentary, rear elevational view of the end fitting and belt rail of FIG. 14.

DESCRIPTION OF THE PREFERRED EMBODIMENTS

Three commonly employed belt rail systems in the trucking industry are shown in FIGS. 5, 6 and 7. The first belt rail 21 of FIG. 5 is comprised of a generally horizontally extending strip or body having an outwardly protruding horizontally extending section 22 in which a plurality of side-by-side apertures 23 are formed. Proximate and below protruding section 23 is a horizontally extending groove or channel 24 defined by flange 25. The belt rail further preferably includes horizontally extending side marginal portions 26 and 27 which may have openings periodically therein for fastening of the belt rail to the side wall of a truck trailer, railroad car or the like (not shown). First belt rail 21 is manufactured and distributed by Evans Products Company and is of the same general type set forth in U.S. Pat. No. Re. 26,309.

A second belt rail, generally designated 31, is shown in FIG. 6 and includes a horizontally extending strip of material having a horizontally extending outwardly protruding central section 32 in which side-by-side vertically extending slots 33 are formed. Slots 33 are defined by flanges 34 which extend inwardly from section 32, as best may be seen in FIG. 3. Extending from the top and bottom of protruding section 32 are horizontally extending side marginal portions 36 and 37, which may be used to fasten the second belt rail 31 to the inside wall of a cargo containing structure.

A third belt rail, generally designated 41, is formed as a generally vertically extending strip having a central protruding section 42 in which generally vertically extending and aligned slots 43 are formed and defined by inwardly extending flanges 44. Belt rail 41 is further provided with vertically extending side marginal edges 46 and 47 which allow the same to be affixed to the side walls of the cargo structure.

Belt rails as shown in FIGS. 6 and 7 are known as "Series E" belt rail systems and are manufactured by Aeroquip Corporation and Ancra Corporation, as well as other companies.

The belt rails of FIGS. 5, 6 and 7 are installed in pairs on oppositely facing inside walls of a truck trailer or on the opposite inside walls of a railroad car. The cargo bar or shoring beam extends between the belt rails and is provided with end fittings at each end of the beam, which enable selective coupling and uncoupling of the cargo bar to the belt rails. As will be apparent from FIGS. 5, 6 and 7, first belt rail 21 is formed with a substantially differing coupling structure than the structures of second belt rail 31 and third belt rail 41. Notwithstanding the substantial difference, it is common for trucking companies to have trailers with all three belt rail systems. As will be apparent, it is possible for the same cargo bar which can be used with horizontally extending belt rail 31 to be used with vertically extending belt rail 41, but such a cargo bar cannot be employed with belt rail 21.

Referring now to FIGS. 1 through 4, the end fitting, generally designated 51, of the present invention can be more fully described. End fitting 51 is formed with a shank 52 adapted for mounting to the end 53 of the central beam 54 of the cargo bar. Central beam 54 is generally formed as a tubular member which extends substantially across the width of the truck trailer between the belt rails, and shank 52 extends into end 53 of the central beam to a distance providing adequate support and strength. The shank 52 may be pinned or otherwise fastened to beam 54, and is preferably adapted for telescopic adjustment inside beam 54 to accommodate slight variations in the distance between the belt rails. One method of accommodating such telescopic mounting is described in more detail in connection with the modified form of the invention shown in FIGS. 8 through 15.

The shank portion 52 of the end fitting terminates in a coupling end or end wall, generally designated 56, having a first coupling means and a second coupling means extending from coupling end 56 for coupling to first belt rail 21 and second belt rail 31.

Cargo bar end fittings have been previously devised which include a plurality of coupling means extending from the coupling end; however, the improved end fitting of the present invention further includes a pair of spaced apart flange members 57 and 58 which extend outwardly from coupling end 56 and are dimensioned for cooperation with the first coupling means in engaging and coupling with first belt rail 21, as best may be seen in FIG. 2. As used herein, the first coupling means shall be deemed to include a pair of pin members 61 and 62 adapted for insertion into apertures 23 and, in the form of the invention shown in FIGS. 1 through 4, downwardly depending foot portion 65 adapted for insertion into groove 24. Thus, upper flange 57 rests on the top of protruding section 22 while lower flange 58 is formed with a downwardly depending section 65 which mates with groove 24 to effect cooperative engagement and coupling of the end fitting and cargo bar to belt rail 21.

Pins 61 and 62 are connected by a yoke 63 which is spring biased by spring 64 to a first or extended position as shown in FIGS. 1, 2 and 3. In the extended position, pins 61 and 62 are urged into an adjacent pair of apertures 23 to lock the cargo bar against displacement horizontally along the belt rail under the cargo loading forces. Manually engageable extension bar 66 is connected to yoke 63 and allows pins 62 to be retracted beyond the coupling end wall 56 so as to enable the cargo bar to be moved along the belt rail to any desired location.

As thus far described, the end fitting is similar to that of U.S. Pat. No. Re. 26,309, but further includes upper flange 57 which is of substantial importance in connection with coupling of the cargo bar to second belt rail 31 and third belt rail 41. Additionally, upper flange 57 provides further support and strength in the coupling by bearing upon the top surface of protruding section 22. This is particularly important when the cargo bars are used to create a floor and are subjected to substantial downward loads.

In the form of the end fitting shown in FIGS. 1 through 4, the second coupling means is provided by locking bar means 71 movably mounted to coupling end 56 and dimensioned for insertion into slots 33 in second belt rail 31. Locking bar means 71 is preferably resiliently biased, such as by mounting on rod 72 having compression spring 73 provided thereon. Thus, the locking bar is normally spring biased to the extended position shown in FIGS. 1, 3 and 4. Locking bar 71 may further be rearwardly displaceable to a withdrawn position inwardly of flanges 57 and 58, as is shown in FIG. 2. In order to accommodate such inward displacement of locking bar 57, upper and lower flanges 57 and 58 are preferably bifurcated or slotted at 74, as is end wall 56.

In order to couple locking bar 71 to second belt rail 31, it is preferable that the locking bar include a lower end provided with a notch adapted to pass beyond and drop behind the lower horizontally extending edge 76 defining slots 33 or the corresponding edge 76a defining slots 43. This can be accomplished by providing a notch 77 (best seen in FIG. 4) in the lower edge of bar 71 so as to provide a shoulder 78 which engages the oppositely facing shoulder in the belt rail. The upper end of the bar is preferably formed with a latch means 79 having manually engageable lever 81 which allows the latch to be tilted for insertion and removal of the locking bar from slots 33 and 43 and engagement and disengagement of notch 77 with edge 76 and 76a. The construction of latch 79 and notch 77 can be of the same type that is conventionally used with "Series E" belt rails or rectangular slots tracks, such as the shoring beams manufactured and distributed by Aeroquip Corporation and Kinedyne Corporation of Mountainside, N.J., and other manufacturers. The latch means engages the upper horizontally extending edges defining the slots to prevent raising of the cargo bar unless the latch is released by manually engageable lever 81.

In operation, the end fitting of FIGS. 1 through 4 may be employed with any one of the belt rails of FIGS. 5 through 7 in the following manner. In order to couple the end fitting to belt rail 21, the bifurcated feet 65 on lower flanges 58 can be inserted in groove 24 with upper flange 57 passing over the top of protruding section 22. The protruding section 22 will bear upon locking bar 71 and cause the same to be displaced rearwardly in slot 74 to a position inwardly of end wall 56 of the end fitting. This withdrawn position is shown in FIG. 2. Pins 61 and 62 can be manually retracted by using lever or bar 66 while the feet 65 are being inserted in the groove 24. When the desired horizontal location of the bar is achieved, lever 66 can be released and the retracted pins 61 and 62 will be biased outwardly by springs 64 to be inserted into openings or apertures 23 in the first belt rail. This will positively lock the cargo bar against displacement.

When the cargo bar is to be coupled to either of belt rails 31 or 41, locking bar 71 can be inserted into either of slots 33 or 43. Lever 81 can be pressed forward to pivot latch 79 to a displaced position allowing notch 77 to be passed over the lower edge 76 or 76a of the slots. Once shoulder 78 is in engagement with the back side of the lower edge of the slots, lever 81 can be pivoted to bring the upper edge of latch 79 into engagement with the upper edge of the slots and prevent removal of the locking bar from the slots. As best may be seen in FIG. 4, insertion of the locking bar into the slots causes causes pins 61 and 62 to bear upon the protruding section 32 or 42 proximate the slots and be urged to a rearwardly displaced position against biasing spring 64. Upper and lower flanges 57 and 58 preferably extend from coupling end 56 to substantially the same distance so that they may bear upon protruding section 32 or 42 immediately above and below the slots to hold the end fitting in generally perpendicular stable relation to the belt rail. Thus, the flanges which cooperate with the coupling pins 61 and 62 to hold the end fitting to belt rail 21 also cooperate with locking bar 79 to secure the end fitting to belt rails 31 and 41. In the form of the invention shown in FIGS. 1 through 4, however, both the first coupling means pins 61 and 62 and the second coupling means locking bar 71 are reciprocally mounted to the coupling end in order to allow the end fitting to be used to couple to both types of belt rails.

Referring now to FIGS. 8 and 9, an alternative embodiment of the improved end fitting, generally designated 101, for a cargo bar is shown. Mounted in relatively telescoped relation are two generally U-shaped shank members 102 and 103 which are in turn mounted in the end of central beam 104 of the cargo bar. Shank member 102 terminates in a coupling end 106 from which first and second coupling means extend.

In order to accommodate variances in the distance between opposed walls on which the belt rails are mounted, U-shaped shank element 102 is mounted inside element 103 for sliding axial reciprocation with respect thereto. Shank member 102 is further biased to an outwardly extended position by means of spring 107, which is mounted about shaft 108 and bears upon end wall 109 of member 103 and cross member 111 of member 102. In addition, member 102 is formed with an elongated slot 112 in each of the side walls thereof, and guide member 113, which is carried by shank element 103, extends through the slots 112 in each side wall of element 102. Thus, the combination of shaft 108 passing through an opening in cross member 111, guide member 113 in slot 112 and the sliding fit between the side walls of members 102 and 103 results in guided telescopic reciprocation of the two shank elements, with spring 107 biasing shank element 102 to the extended position shown in FIGS. 8 and 9.

In order to releasably secure the shank of the end fitting of the present invention to the central beam 104 of the cargo bar, pin 114 is mounted for vertical reciprocation through plate 116 and cross member 113, both of which are secured to shank element 103. Spring 117 biases pin 114 to a position extending above the top surface of shank element 103 so that the pin may mate with and may be inserted in an opening 118 in the end of central beam 104. In order to release the shank from the central beam, pin 114 can be reciprocated downwardly against spring 117 until the parts are free to be untelescoped (it being noted that pin 114 is free to move downwardly through an opening in guide member 113).

Since the central beam telescopes around shank element 103, there is considerable strength at this portion of the shank element. In order to provide additional strength in the portion 102 of the shank extending beyond the end of beam 104, it is preferable that the upper edge of element 102 be rolled over to provide a pair of inwardly extending flanges 119 which stiffen shank element 102. It should also be noted that as illustrated in both FIGS. 8 and 9, central beam 104 is shown in half cross-section for the purpose of clarity. It will be understood, however, that central beam 104 is preferably formed as a rectangular tube extending around all sides of the shank and dimensioned for sliding receipt of the shank therein.

The coupling portion of the end fitting is preferably formed as a U-shaped member 131 having generally perpendicularly extending upper flange 132 and a generally perpendicularly extending lower flange 133. Positioned intermediate flanges 132 and 133 is a pair of pin members 134 and 136, which are joined by a common yoke 137 and spring biased by spring 138 in substantially the same manner as described in connection with the first embodiment of the present invention. Yoke 137 is provided with a manually engageable bar or lever 139 which can be used to reciprocate pins 134 and 136 against spring 138. The rearward travel of pin 141 about which spring 138 is mounted is limited by the rear wall of U-shaped cross member 142, which acts as a stop. The stop is dimensioned so that the front end of pins 136 and 134 can be withdrawn to a position which is substantially flush with the outermost surface of U-shaped member 131.

In this form of the invention, the pair of pins 134 and 136 act as the first coupling means and cooperate with flanges 132 and 133 to enable coupling of the device to first belt rail 21, as is shown in FIGS. 10 and 11. Thus, flange 132 bears upon the top portion of protruding section 22 while pins 136 and 134 extending through adjacent apertures 23 and lower flange 133 bears upon the belt rail immediately below the protruding section 22. In this form of the invention, there is no interlocking with flange 25 nor is there a foot provided to extend into the groove 24. The pins of the first coupling means lock the end fitting against sliding along the rail horizontally and the flanges assist in support of vertical loads as well as in resisting angular deflection by bearing upon a substantial length of track 21 above and below the protruding section.

The second coupling means suitable for connection to second belt rails 31 and 41 is provided by formation of flanges 132 and 133 for insertion into slots 33 and 43, and further by providing notches or recesses 151 and 152 in the flanges instead of on the lower end of a locking bar. In addition to being spaced apart by a vertical height at least equal to the vertical height of protruding section 22 in the first belt rail, flanges 132 and 133 are spaced apart by a distance about equal to the spacing between adjacent slots 33, and further, are preferably spaced apart by a distance at least about equal to the distance between edge 153 of slots 43 and adjacent outer edge 154 of belt rail 41.

As best may be seen from FIGS. 12 through 15, this spacing of the notched flanges allows the cargo bar to be rotated by 90° and inserted into slots 33 so that the flanges can be passed into adjacent slots until notches 151 and 152 drop over the lower edge 76 of the slots. Similarly, when the end fitting is to be coupled to belt rail 41, one of the flanges can be inserted in slots 43 until the notch therein passes over edge 76a and the remaining flange is in close abutting relation to edge 54. The end fitting is gravity biased so that notches 151 remain over the lower edges 76 and 76a.

As will be seen from FIGS. 12 and 14, pins 134 and 136 must be rearwardly reciprocated and bear upon the protruding sections 32 and 42 of the second and third belt rails, respectively, when the end fitting is coupled to these belt rails.

In order to increase the strength and stability of the coupling to the second and third belt rails, it is preferable that means be provided so that at least one of the flanges will substantially fill the lateral width dimension of slots 33 and 43. This can be accomplished by providing a spacer element 161 which extends a substantial distance along the length of the flange, but does not interfere with notches 151 and 152. In the fitting of FIGS. 8 through 11 and 14 and 15, a single spacer element 161 is provided, while in the device of FIGS. 12 and 13, as best may be seen in FIG. 13, a second spacer element 161a is shown mounted to flange 133. This construction causes the flanges and spacer elements to bear against the inwardly turned flanges 34 and 44 of the second and third belt rail to increase the overall stability of the coupling. It should be noted that the addition of the spacer elements is preferably on the outside of flanges 132 and 133 so that the spacing between flanges is not effectively reduced to a distance less than the distance between slots. As will be appreciated, the flanges and spacer elements can be formed as an integral member, with the spacer element notched, if it extends to the notched area.

In the belt rails which are commercially available in the trucking industry, the vertical height of the protruding section 22 of belt rail 21 is about 1.5 inches. Similarly, the spacing between the most closely adjacent flanges 34 of adjacent slots 33 in belt rail 31 is 1.5 inches, and the spacing between flange 44 and the outside edge 154 in belt rail 41 is also 1.5 inches. Accordingly, the distance between flanges 132 and 133 can be conveniently formed to be about 1.5 inches so that the flanges will mate with all three belt rails and cooperate to enable coupling of the end fitting to any of the belt rails in the manner set forth.

As will be readily appreciated, the flanges and the location of notches 151 and 152 cannot cause the flanges to protrude inwardly to a distance greater than the outward protrusion of the sections in which the slots are formed in the second and third belt rails. It should also be noted that spring 138 will tend to push the pins against the protruding sections so that the outermost shoulder of the notches bears against the oppositely facing shoulder of the lower horizontal edges of the slots. The coupling would be equally satisfactory if spring 107 had a strength which was greater than spring 138 and would tend to cause the oppositely facing shoulders of the notches 151 and 152 to bear upon the outside surface of the protruding portions defining the lower edge of slots 33 and 43.

The end fitting of the present invention, and particularly both the above described forms of the same, may be used with still other forms of belt-rails or tracks. Such other tracks are not in as widespread use as the three types of belt rails set forth herein, but they include, for example: Evans Products Company's "Slimline" siderail or belt rail, and Aeroquip Corporation's "Series A" rectangular opening track or belt rail.

What is claimed is:

1. An end fitting for a cargo bar formed for use in coupling said cargo bar to a first belt rail, said first belt rail being formed as a horizontally extending strip having a horizontally extending outwardly protruding section with a plurality of side-by-side openings therein, a second belt rail formed as a horizontally extending strip having a horizontally extending outwardly protruding section with side-by-side vertically extending slots therein, and a third belt rail formed as a vertically extending strip having a vertically extending protruding section with vertically extending generally aligned slots therein, said end fitting including a shank formed for mounting to an end of said cargo bar, said shank terminating in a coupling end, and a first coupling means and a second coupling means extending from said coupling end and formed to secure and couple said end fitting to said first belt rail, said second belt rail and said third belt rail, respectively, wherein the improvement comprises:

a pair of spaced apart flange means extending outwardly from said coupling end, said flange means being formed and dimensioned for cooperative engagement of said first belt rail with said first coupling means and further for cooperative engagement of said second belt rail with said second coupling means so as to assist in preventing uncoupling of said cargo bar under cargo loading forces when coupled to either of the belt rails, said flange means extending horizontally over and under said outwardly protruding section of said first belt rail and being formed to extend outwardly from said coupling end to substantially the same distance therefrom for engagement with and bearing upon said first belt rail above and below said protruding section, at least one of said first and said second coupling means being mounted to said coupling end for selective movement to a first position enabling coupling with one of the belt rails and to a second position enabling the remainder of said first and said second coupling means to be coupled to the remainder of the belt rails, said first coupling means being formed as at least one pin disposed intermediate said flanges and formed and dimensioned for mating insertion into said opening in said first belt rail, said pin being mounted for selective movement to and from said first position at which said pin is inserted in said openings in said first belt rail and to and from said second position at which said pin bears upon said protruding section of said second belt rail intermediate said slots.

2. An end fitting for a cargo bar as defined in claim 1 wherein,
said flanges being further spaced apart a distance about equal to the distance between a vertically extending edge defining said slots and an adjacent vertically extending outer edge of said third belt rail, said flanges being further formed for insertion into said slots in said third belt rail.

3. An end fitting for a cargo bar as defined in claim 1 wherein,
said second coupling means is provided by a downwardly facing notch formed to drop down over and mate with the upwardly facing lower horizontally extending edge defining said slots in said second belt rail.

4. An end fitting for a cargo bar as defined in claim 3 wherein,
said notch is provided by a notch in the lower end of locking bar means dimensioned for insertion into said slots in said second belt rail.

5. An end fitting for a cargo bar as defined in claim 3 wherein,
said notch is provided by a notch formed in each of said flanges, said notch facing downwardly upon orientation of said end fitting for insertion of said flanges into said slots on said second belt rail, and at least one of said flanges being further formed of a thickness to substantially fill the width dimension of said slots.

6. An end fitting for a cargo bar as defined in claim 2 wherein,
said flanges each have a thickness dimension about equal to the thickness dimension of said slots and the spacing between the innermost sides of said flanges is equal to the distance between adjacent edges of said slots in said second belt rail.

7. An end fitting for a cargo bar as defined in claim 1 wherein,
said second coupling means is provided by locking bar means movably mounted to said coupling end and dimensioned for insertion into said slots in said second belt rail, said locking bar means being resiliently biased to an extended position outwardly of said flanges for insertion into said slots while said flanges bear upon said protruding portion proximate said slots, and said locking bar means being displaceable to a withdrawn position inwardly of said flanges allowing said pin of said first coupling means to couple said cargo bar to said first belt rail.

8. An end fitting for cargo bar as defined in claim 1 wherein,
said locking bar is formed with a lower end formed with a notch adapted to pass beyond and drop down behind the horizontally extending lower edges defining said slots and the upper end of said bar is formed with releasable latch means formed to engage the upper horizontally extending edges defining said slots and to prevent withdrawal of said locking bar from said slots except upon release of said latch means.

9. An end fitting for a cargo bar formed for coupling of said cargo bar to any one of a first belt rail formed as a horizontally extending strip with a horizontally extending protruding section having side-by-side apertures therein and a vertical height, a second belt rail formed as a horizontally extending strip with a horizontally extending protruding section having side-by-side vertically extending slots therein with a known spacing between adjacent slots, and a third belt rail formed as a vertically extending strip with an outer edge and a vertically extending protruding section having generally vertically aligned vertically extending slots therein, said slots each having an edge, and said third belt rail having a known distance between said edge of said slots and said outer end of said third belt rail, said end fitting including a shank formed for resiliently extensible mounting to an end of said cargo bar, said shank terminating in a coupling end, first coupling means mounted to said coupling end formed for releasable coupling of said cargo bar to said coupling end and formed for releasable coupling of said cargo bar to said second belt rail, wherein the improvement comprises:

a pair of relatively spaced apart flanges extending substantially perpendicularly and outwardly of said coupling end proximate the top and the bottom sides of said coupling end to form with said coupling end a U-shaped channel, said flanges extending upwardly of said coupling end to substantially the same distance, said flanges being vertically spaced apart by a distance:
 i. at least equal to the vertical height of said protruding section of said first belt rail,
 ii. about equal to the spacing between adjacent slots in said second belt rail, and
 iii. at least equal to the distance between the edge of said slots and the adjacent outer edge of said third belt rail, and at least one of said flanges having a thickness dimension over a portion thereof about equal to the thickness dimension of said slots in said second and said third belt rails, said flanges further having a height enabling them to be inserted into said slots in said second belt rail and said third belt rail;

said first coupling means being formed as a pair of pins extending from said coupling end intermediate said flanges and formed for insertion into said apertures in said first belt rail, said pins being movably mounted to said end fitting and resiliently biased to a first position extending outwardly of said coupling end and retractable to a second position enabling coupling of said end fitting to said second belt rail and said third belt rail; and said second coupling means being formed by said flanges and a slot formed in each of said pair of flanges in a horizontally extending edge thereof, said slot providing a shoulder formed for engagement with an oppositely facing shoulder defining the lower horizontally extending edges of said slots in said second belt rail and said third belt rail to prevent withdrawal of said end fitting therefrom.

10. An end fitting for a cargo bar formed for coupling of said cargo bar to any one of a first belt rail formed as a horizontally extending strip with a horizontally extending protruding section having side-by-side apertures therein, a second belt rail formed as a horizontally extending strip with a horizontally extending protruding section having side-by-side vertically extending slots therein, and a third belt rail formed as a vertically extending strip with a vertically extending protruding section having generally vertically aligned vertically extending slots therein, said end fitting including a shank formed for mounting to an end of said cargo bar, said shank terminating in a coupling end, first coupling means mounted to said coupling end formed for releasable coupling of said cargo bar to said first belt rail, and second coupling means mounted to said coupling end and formed for releasable coupling of said cargo bar to said second belt rail, wherein the improvement comprises:

a pair of relatively spaced apart flanges extending substantially perpendicularly and outwardly of said coupling end proximate the top and the bottom sides of said coupling end, said flanges extending outwardly of said coupling end to substantially the same distance;

said first coupling means being formed as a pair of pins extending from said coupling end intermediate said flanges and formed for insertion into said apertures in said first belt rail, said pins being movably mounted to said end fitting and resiliently biased to a first position extending outwardly of said coupling end and retractable to a second position enabling coupling of said end fitting to said second belt rail and said third belt rail; and said second coupling means being formed as a locking bar movably mounted to said coupling end and dimensioned for insertion into said slots in said second belt rail and said third belt rail, said locking bar being resiliently biased to an extended position outwardly of said flanges for insertion into said slots while said flanges bear upon the protruding portion proximate said slots and being displaceable to a withdrawn position inwardly of said flanges allowing coupling of said end fitting to said first belt rail by means of said pins.

11. An end fitting for a cargo bar as defined in claim 10 wherein,
said locking bar is generally vertically oriented; and
said flange members are each bifurcated and said coupling end is slotted to provide a recess for movement and receipt of said locking bar to said withdrawn position.

12. An end fitting for a cargo bar as defined in claim 10 wherein,
a lower edge of said flanges is formed for interengagement with a horizontally extending groove in said first belt rail; and
said locking bar includes latch means for releasably securing said locking bar against withdrawal from said slots in said second belt rail and in said third belt rail.

* * * * *

UNITED STATES PATENT AND TRADEMARK OFFICE
CERTIFICATE OF CORRECTION

PATENT NO. : 4,033,268
DATED : July 5, 1977
INVENTOR(S) : Virginia M. Klekar

It is certified that error appears in the above-identified patent and that said Letters Patent are hereby corrected as shown below:

Column 1, line 66, change "invariable" to ---invariably---;

column 5, line 47, change "slots" to ---slot---;

column 7, line 43, change "extending" to ---extend---;

column 10, line 18, change the numeral "1" to ---5---;

line 38, change the numeral "2" to ---7---;

column 11, line 8, change "upwardly" to ---outwardly---.

Signed and Sealed this

Thirtieth Day of May 1978

[SEAL]

Attest:

RUTH C. MASON
Attesting Officer

LUTRELLE F. PARKER
Acting Commissioner of Patents and Trademarks